US012055772B2

(12) United States Patent
Testa et al.

(10) Patent No.: US 12,055,772 B2
(45) Date of Patent: Aug. 6, 2024

(54) OPTICAL INTERCONNECT AND METHOD OF MANUFACTURE THEREOF

(71) Applicant: Telefonaktiebolaget LM Ericsson (publ), Stockholm (SE)

(72) Inventors: Francesco Testa, Pisa (IT); Marco Romagnoli, Pisa (IT); Luigi Tallone, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 530 days.

(21) Appl. No.: 17/298,203

(22) PCT Filed: Dec. 18, 2018

(86) PCT No.: PCT/EP2018/085475
§ 371 (c)(1),
(2) Date: May 28, 2021

(87) PCT Pub. No.: WO2020/125946
PCT Pub. Date: Jun. 25, 2020

(65) Prior Publication Data
US 2022/0091349 A1     Mar. 24, 2022

(51) Int. Cl.
*G02B 6/42*     (2006.01)
*G02B 6/43*     (2006.01)

(52) U.S. Cl.
CPC .............. *G02B 6/4214* (2013.01); *G02B 6/43* (2013.01)

(58) Field of Classification Search
CPC ........ G02B 6/4214; G02B 6/43; G02B 6/136; G02B 6/12002; G02B 6/122; G02B 6/124; G02B 6/4204
See application file for complete search history.

(56) References Cited

U.S. PATENT DOCUMENTS

2003/0161573 A1*   8/2003   Ishida .................. G02B 6/4214
385/14

FOREIGN PATENT DOCUMENTS

| EP | 3278476 A1 | 2/2018 |
| EP | 3278476 B1 | 10/2018 |
| WO | 2016155843 A1 | 10/2016 |

OTHER PUBLICATIONS

PCT International Search Report, mailed Sep. 11, 2019, in connection with International Application No. PCT/EP2018/085475, all pages.

(Continued)

*Primary Examiner* — John Bedtelyon
(74) *Attorney, Agent, or Firm* — Sage Patent Group

(57) ABSTRACT

An optical interconnect for optically coupling at least a first optical integrated circuit and a second optical integrated circuit. The optical interconnect comprises at least two layers of optically transparent material. There is a first optical waveguide arranged along a surface of a first one of the at least two layers of optically transparent material. There is further a first non-guided optical path extending from the first optical waveguide through the at least two layers of optically transparent material. A first reflective element is arranged to receive light from at least one of the first non-guided optical path and the first optical waveguide and direct the light to the other of the first non-guided optical path and the first optical waveguide. At least one lens is arranged at a boundary between two of the at least two layers of optically transparent material. The at least one lens is arranged to receive and focus light travelling along the first non-guided optical path.

15 Claims, 7 Drawing Sheets

(56) References Cited

OTHER PUBLICATIONS

PCT Written Opinion, mailed Sep. 11, 2019, in connection with International Application No. PCT/EP2018/085475, all pages.
Aleksandr Biberman et al., "Photonic Network-on-Chip Architectures Using Multilayer Deposited Silicon Materials for High-Performance Chip Multiprocessors", ACM Journal on Emerging Technologies in Computing Systems, vol. 7, No. 2, Article 7, Jun. 2011, 25 pages.
Mehrdad Mirshafiei et al., "Glass interposer for short reach optical connectivity", Optics Express 12375, vol. 24, No. 11, May 27, 2016, 10 pages.
Nicolas Sherwood-Droz et al., "Scalable 3D dense integration of photonics on bulk silicon", Optics Express 17758, vol. 19, No. 18, Aug. 25, 2011, 8 pages.
European Communication issued Oct. 9, 2023 in connection with counterpart European Application No. 18825986.5, 7 pages.

\* cited by examiner

Example of diffractive lens (Silica)

OPTICAL INTERCONNECT AND METHOD OF MANUFACTURE THEREOF

TECHNICAL FIELD

The invention relates to an optical interconnect for optically coupling at least a first optical integrated circuit and a second optical integrated circuit, and a method of manufacture thereof. The invention further relates to an optical integrated circuit apparatus, a radio network node and a datacentre.

BACKGROUND

It is expected that next generation hardware units for 5G network nodes and data centre systems will have substantially increased processing capacity reaching tens of terabit/sec per unit. To achieve this, not only must the data rate of the signals exchanged between Application Specific Integrated Circuits, ASICs, in the same hardware unit increase from the currently used data rate of twenty-five Gbps to fifty Gbps, but the bandwidth density and energy efficiency of the hardware unit must also increase. In these circumstances intra-board electrical interconnects, which are currently based on copper lines on a Printed Circuit Board, PCB, need to be replaced by low loss, wideband, highly integrated and more scalable optical interconnects. In order to best exploit optical interconnects for intra-board communication, it is expected that new hardware units will be based on optical multi-chip modules, OMCMs.

FIG. 1 shows an example implementation related to a future high capacity baseband processing unit, BBU, 100 for a 5G network. In this example, four baseband processor ASICs 110 perform the processing of user and control data. The ASICs 110 communicate with each other and an electrical switch 120 via high speed optical links (not shown) with five hundred Gbps capacity. These optical links are comprised within an optical interconnect 140, in this example in the form of a silica starboard. Traffic is received by several radio interfaces (not shown) which are connected optically to external radio units (not shown) and or other baseband units (not shown) with a total external interconnect capacity of one Tbps. The switch 120 routes radio traffic between the baseband processor ASICs 110 and these radio interfaces. The link length of the internal optical interconnect 140 is less than one metre, whilst that of the external links may be up to ten km.

In this example, the BBU 100 uses OMCMs 130 for each baseband processor ASIC 110 and the electrical switch 120. FIG. 2 shows an example of each OMCM 130 in more detail. Each OMCM 130 includes a high processing capacity electronic ASIC die 110 of side less than two cm electrically connected by a multi-layer organic substrate 200 to a large-scale integration silicon photonics integrated chip, PIC 210. The PIC 210 comprises a bank of high speed optical transceivers (not shown) and is coupled to a light source (not shown) by an optical link 240. An analog electronic integrated chip, EIC, 220 is used to drive the optical transceivers. This EIC 220 is 3D integrated on top of the PIC 210. Through silicon vias, TSV, may be used to connect high speed electrical signals from the substrate 200 to the EIC 220 through the PIC 210 while the connection of the EIC 220 to the PIC 210 may be provided by micro-bumps. Wire bonding can also be used instead of TSV to connect the PIC 210 to the organic substrate 200. Each PIC 210 is coupled to the optical interconnect 140, in this example by optical waveguides 230.

An optical interconnect for optically interconnecting a number of chips, whilst avoiding waveguide crossings and a bottleneck due to limited space, has been proposed in Nicolas Sherwood-Droz and Michal Lipson: "Scalable 3D dense integration of photonics on bulk silicon", Optics Express, Vol. 19, No. 18, 29 Aug. 2011 and A. Biberman et al.: 'Photonic Network-on-Chip Architectures Using Multi-layer Deposited Silicon Materials for High-Performance Chip Multiprocessors', ACM Journal on Emerging Technologies in Computing Systems, Vol. 7, No. 2, Article 7, Pub. date: June 2011. These optical interconnects are based on a 3D structure requiring vertical integration of many different photonic layers of deposited silicon nitride waveguides. The coupling between two layers is achieved either by evanescent coupling or by introducing holes in the structure to allow vertical propagation of the optical beams. However, this structure has a high loss over an intra-board interconnect length of for example up to thirty cm. Furthermore, evanescent coupling does not allow exchanging signals between non-adjacent layers, thus limiting the optical interconnect's bandwidth or interconnection density. Similarly, where vertical propagation of the optical beams is through holes in the structure, beam divergence during propagation, again limits the length of the vertical segments and thus the optical interconnect's bandwidth density. Furthermore, due to the high index contrast of silicon nitride which constitutes the core material of the waveguides, the size of the waveguides is sub-micrometric. This means that waveguide overlay accuracy is a tight parameter, which decreases yield and increases manufacturing cost.

A glass interposer for low loss chip to chip connectivity has been proposed in Mehrdad Mirshafiei, Jean-Philippe, Stephane Lessard, Rèal Vallèe, and David V. Plant: 'Glass interposer for short reach optical connectivity', Optics Express, Vol. 24, No. 11, 26 May 2016. In this interposer horizontal waveguides are scribed by a femtosecond laser technique in the glass material. Light propagates along vertical segments via non-guided optical paths i.e. by propagating in free space, FSO, through the glass material. This interposer may provide low loss chip to chip connectivity. However, with this interposer it is only possible to realize waveguides in a single layer of glass material. Indeed, beam divergence along the vertical segments which causes losses forces the designers to place the horizontal waveguides very close to the interposer surface. These factors limit the interconnection density of the interposer. In addition, since the waveguides are scribed by a femtosecond laser technique the waveguides must be scribed serially. Thus, the fabrication process is not optimised for mass-production.

The Applicant has appreciated that it would be desirable to provide an improved optical interconnect for optically coupling at least a first optical integrated circuit and a second optical integrated circuit.

SUMMARY

According to a first aspect of the invention there is provided an optical interconnect for optically coupling at least a first optical integrated circuit and a second optical integrated circuit. The optical interconnect comprises at least two layers of optically transparent material. The optical interconnect further comprises a first optical waveguide arranged along a surface of a first one of the at least two layers of optically transparent material. The optical interconnect further comprises a first non-guided optical path extending from the first optical waveguide through the at least two layers of optically transparent material. A first reflective element is arranged to receive light from at least one of the first non-guided optical path and the first optical waveguide and direct the light to the other of the first non-guided optical path and the first optical waveguide. At least one lens is arranged at a boundary between two of the at least two layers of optically transparent material. The at least one lens is arranged to receive and focus light travelling along the first non-guided optical path.

Advantageously, the at least one lens enables the "vertical" path segment i.e. the first non-guided optical path to extend through at least two layers of optically transparent material without increasing optical loss. Thus, the optical interconnect may advantageously have an increased interconnection density, connecting many pairs of optical integrated circuits without waveguide crossing, in comparison to prior art optical interconnects. Furthermore, the optical interconnect may be easier and cheaper to manufacture than prior art optical interconnects, and thus more suitable for mass production.

The at least one lens may comprise a first lens and a second lens. The first lens may be arranged to receive light travelling along the first non-guided optical path and output a parallel light beam. The second lens may be arranged to receive and focus the parallel light beam.

Advantageously, this arrangement may facilitate implementation of the at least one lens. Furthermore, this arrangement may, advantageously, enable the interconnection density of the optical interconnect to be further increased. The creation of a parallel light beam (parallel to the propagation axis of the beam) enables the length of the "vertical" segment to be increased with no or minimal increase in optical loss, since beam divergence of the parallel light beam will be limited.

The at least two layers of optically transparent material may comprise at least three layers of optically transparent material. The second lens may be arranged at a boundary between a different two of the at least three layers of optically transparent material than the first lens.

The at least one lens may comprise a refractive lens or a diffractive lens.

The at least one lens may be formed in a surface of at least one of the at least two layers of optically transparent material. Advantageously, this enable the centre of the lens to be under the surface level of the material. This may prevent contact and possible damage of the lens.

The optically transparent material may be silica. Further, the first optical waveguide may be made from or comprise silica. Advantageously, the use of silica may reduce optical losses. For example, using a first optical waveguide made from silica may provide losses in the region of only 0.02 dB/cm. In addition, since silica waveguides have relatively large dimensions, these waveguides may have a more relaxed alignment tolerance, thus facilitating manufacture.

The optical interconnect may further comprise an input for coupling to a first optical integrated circuit, an output for coupling to a second optical integrated circuit and an optical path arranged to optically couple to the input to the output. The optical path may comprise the first optical waveguide and the first non-guided optical path.

The reflective element may be embedded in or formed by an edge of the first one of the at least two layers of optically transparent material.

According to a further aspect of the invention there is provided an integrated circuit apparatus. The integrated circuit apparatus comprises a first integrated optical circuit, a second integrated optical circuit and an optical interconnect according to the first aspect of the invention. The optical interconnect may be arranged to optically couple the first integrated optical circuit and the second integrated optical circuit.

According to a further aspect of the invention there is provided a radio network node comprising the integrated circuit apparatus.

According to a further aspect of the invention there is provided a datacentre comprising the integrated circuit apparatus.

According to a further aspect of the invention there is provided a method of manufacturing an optical interconnect for optically coupling at least a first optical integrated circuit and a second optical integrated circuit. The method comprises providing at least two layers of optically transparent material, and forming a first optical waveguide along a surface of a first one of the at least two layers of optically transparent material. The method further comprises providing a first reflective element arranged to receive light from at least one of the first optical waveguide and a first non-guided optical path and direct the light to the other of the first optical waveguide and the first non-guided optical path. The first non-guided optical path extends from the first optical waveguide through the at least two layers of optically transparent material. The method further comprises providing at least one lens arranged at a boundary between two of the at least two layers of optically transparent material. The at least one lens is arranged to receive and focus light travelling along the first non-guided optical path.

Providing the at least one lens may comprise providing a first lens and a second lens. The first lens may be arranged to receive light travelling along the first non-guided optical path and output a parallel light beam. The second lens may be arranged to receive and focus the parallel light beam.

Providing the at least two layers of optically transparent material may comprise providing at least three layers of optically transparent material. In this case, providing the first lens and the second lens may comprise arranging the second lens at a boundary between a different two of the at least three layers of optically transparent material than the first lens.

Forming the first optical waveguide may comprise etching the first optical waveguide onto the first one of the at least two layers of optically transparent material. This method may advantageously simplify manufacture, in particular by enabling a plurality of waveguides for respective interconnections to be formed simultaneously on a layer of the optically transparent material.

BRIEF DESCRIPTION OF THE DRAWINGS

Embodiments of the invention will now be described by way of example only and with reference to the accompanying drawings in which.

DETAILED DESCRIPTION

Figure 1:
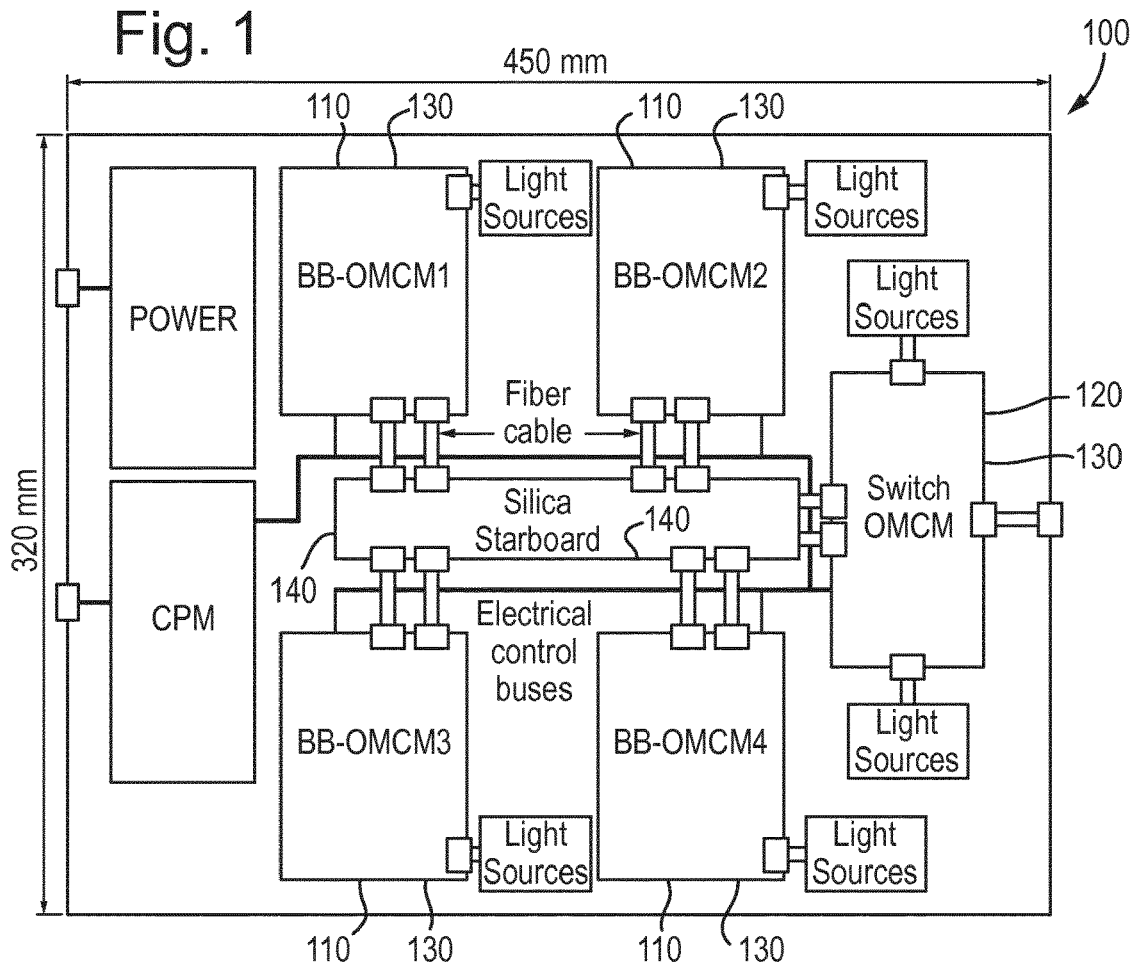
FIG. 1 illustrates an integrated circuit apparatus comprising an optical interconnect.
Figure 2:
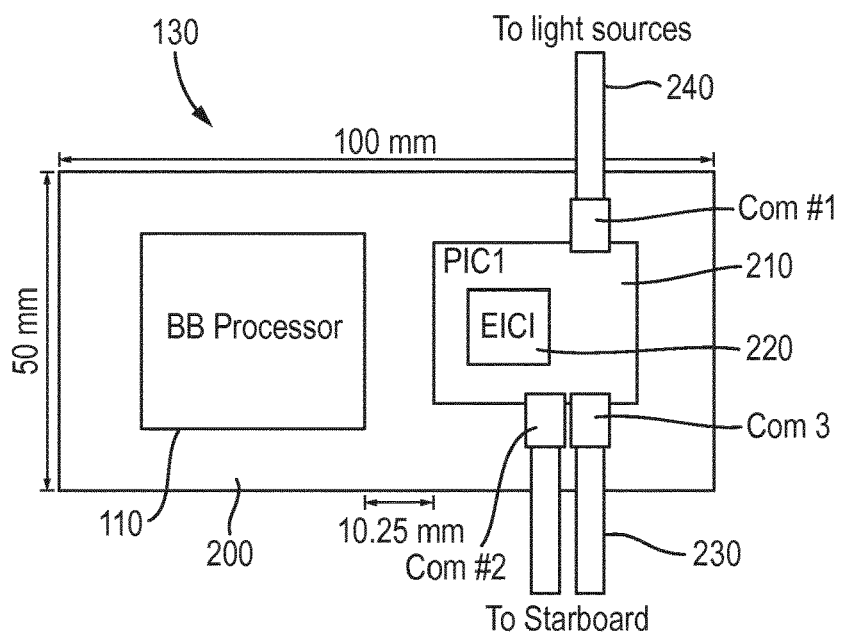
FIG. 2 illustrates an example optical integrated circuit.
Figure 3:
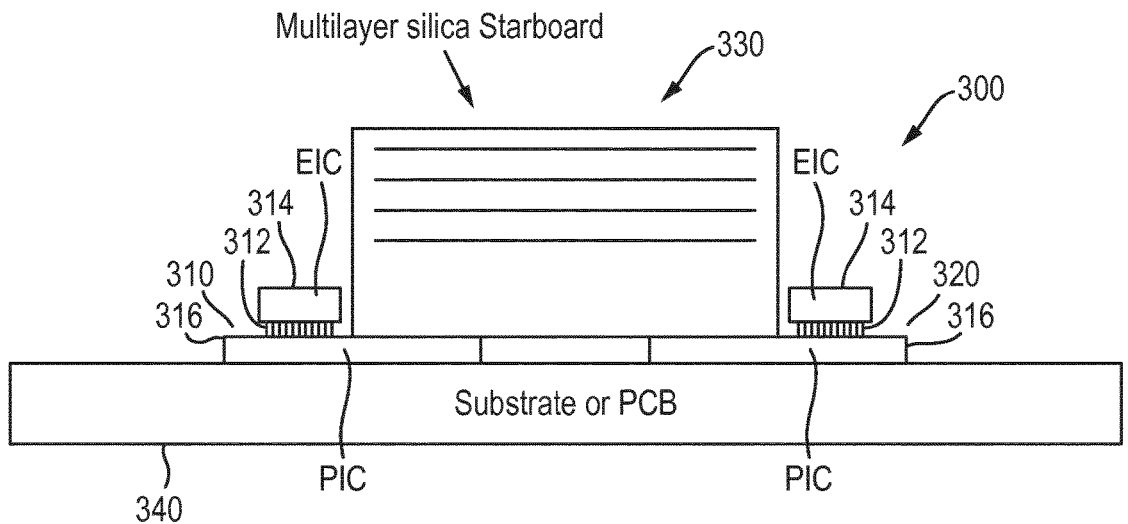
FIG. 3 illustrates an integrated circuit apparatus according to an embodiment of the invention.

FIG. 3 illustrates an integrated circuit apparatus 300 according to an embodiment of the invention. The integrated circuit apparatus 300 comprises a first integrated optical circuit 310, a second integrated optical circuit 320 and an optical interconnect 330. The optical interconnect 330 is arranged to optically couple the first integrated optical circuit 310 and the second integrated optical circuit 320. In this example only two integrated optical circuits 300, 320 are shown. However, it should be appreciated that the optical interconnect 330 may be arranged to optically connect many pairs of integrated optical circuits (not shown). Thus, the optical interconnect 330 may comprise many optical links.

Figure 4:
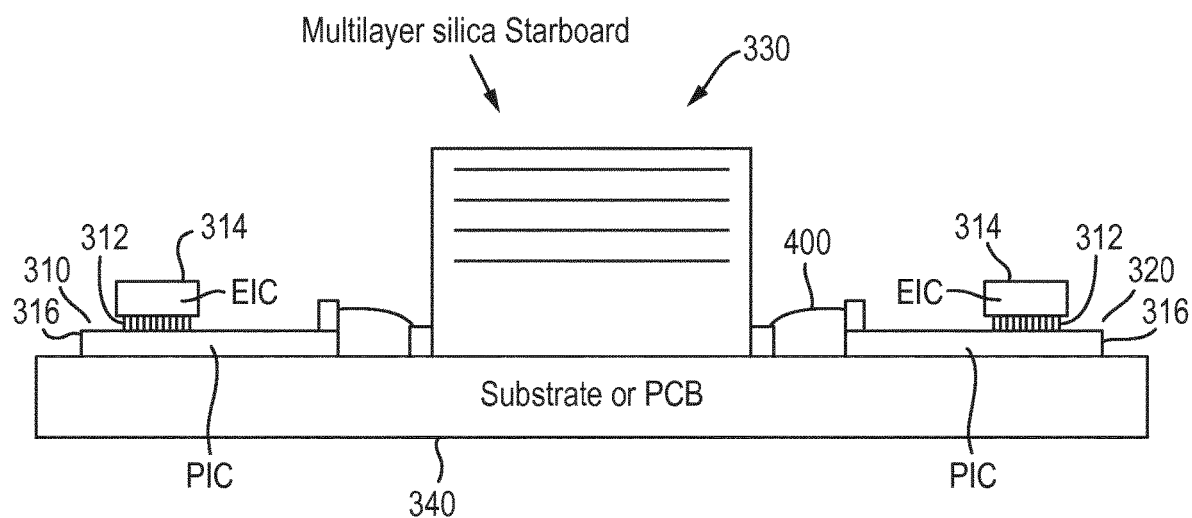
FIG. 4 illustrates an integrated circuit apparatus according to an embodiment of the invention.

In this example, both the first integrated optical circuit 310 and the second integrated optical circuit 320 is a PIC 312 which is part of a OMCM 316. As described above, in this example, each of these PICs 312 has a respective EIC 314 mounted thereon, which is arranged to drive the PIC 312. Each PIC 312 has a respective processor ASIC (not shown) electrically connected thereto. In this example these OMCMs 316 are arranged on a common substrate or PCB 340 but these OMCMs 316 may instead be arranged on different substrates. In this example, the optical interconnect 330 is arranged on top of the PICs 312. Thus, in this example, there is a vertical connection between each PIC 312 and the optical interconnect 330. However, in an alternative embodiment, as shown in FIG. 4, the optical interconnect 330 may be provided on the substrate or PCB 340, between the first and second PICs 312. In this case, each PIC 312 may be coupled to the optical interconnect 330 for example by a short ribbon fibre cable 400, whereby light enters and exits the optical interconnect 330 horizontally.

Figure 5:
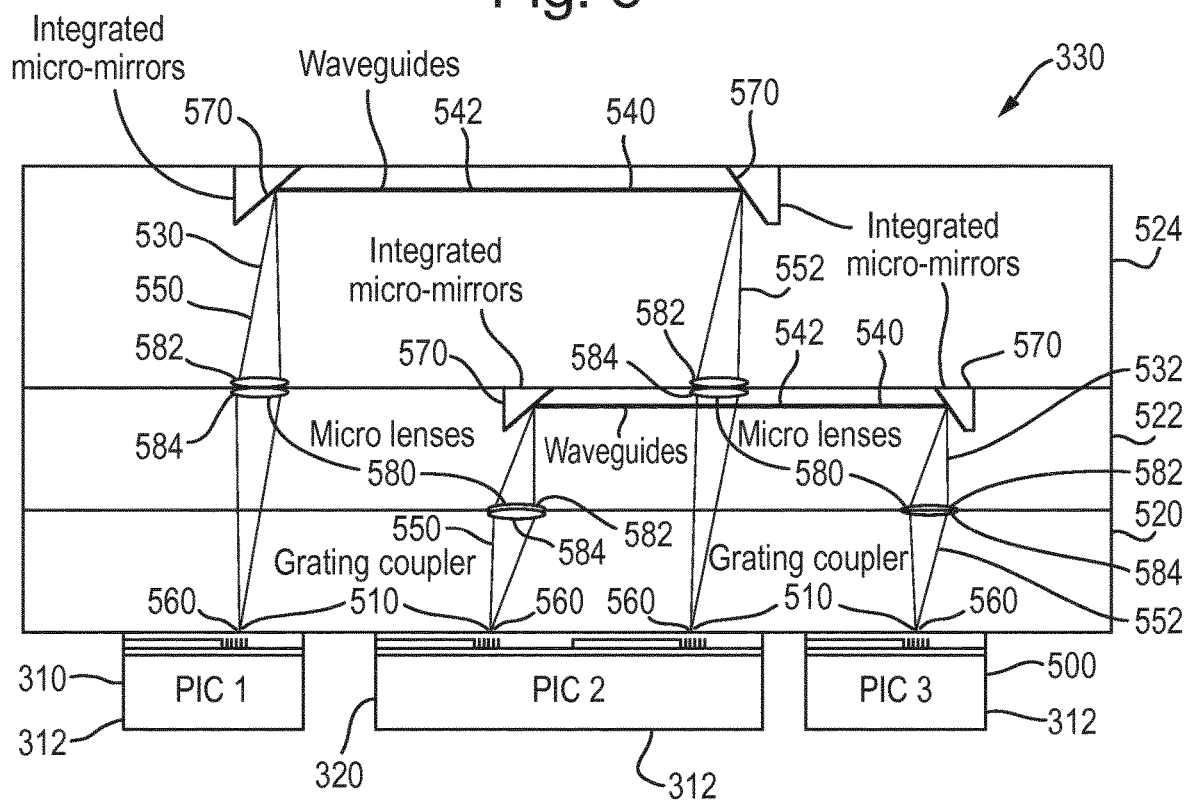
FIG. 5 illustrates an optical interconnect according to an embodiment of the invention.

FIG. 5 shows an example of an optical interconnect 330 for optically coupling a first optical integrated circuit 310 and a second optical integrated circuit 320 according to an embodiment of the invention. In this example, the optical interconnect 330 is shown optically coupling two pairs of optical integrated circuits, which in this example are in the form of PICs 312. There are three optical integrated circuits 310, 320 and 500: a first optical integrated circuit 300, a second optical integrated circuit 320 and a third optical integrated circuit 500. The optical interconnect 330 is arranged to optically couple the first optical integrated circuit to the second optical integrated circuit 320, and the second optical integrated circuit 320 to the third optical integrated circuit 500. It should be appreciated that the second and third optical integrated circuits 320, 500 may also be referred to as a "first" optical integrated circuit and a "second" optical integrated circuit respectively.

In this example, the optical interconnect 330 is arranged on top of the PICs 312 and is coupled thereto by respective grating couplers 510.

In this example the optical interconnect 500 comprises three layers of optically transparent material 520, 522, 524.

In this example, the optically transparent material is silica. However, those skilled in the art will appreciate that the optically transparent material may alternatively be a different glass or other optically transparent material. 'Optically transparent' means that the material is transparent to at least one optical beam, and thus that that optical beam may propagate through the material. For example, the optically transparent material could be a plastic material, silicon nitride, a polymeric material or silicon instead of a glass material.

In this example, the first optical integrated circuit 310 and the second optical integrated circuit 320 are coupled by a first optical path 530 through the optical interconnect 330. The second optical integrated circuit 320 and the third optical integrated circuit 500 are coupled by a second optical path 532 through the optical interconnect 330.

Each of the optical paths 530, 532 comprises a "first" optical waveguide 540 arranged along a surface of one of the layers of optically transparent material 520, 522, 524. The first optical waveguide may be arranged on the surface of the layer or buried for example a few microns beneath the surface of the layer. In this example, the first optical waveguide 540 for the first optical path 530, coupling the first optical integrated circuit 310 and the second optical integrated circuit 320, is arranged along a surface of the "third" layer of optically transparent material, 524 (counting upwards from the surface of the optical interconnect 330 which is coupled to the PICs 312). On the other hand, the first optical waveguide 540 for the second optical path 532, coupling the second optical integrated circuit 320 and the third optical integrated circuit 500, is arranged along a surface the "second" layer of the optically transparent material 522 (again counting upwards from the surface of the optical interconnect 330 which coupled to the PICs 312).

These first optical waveguides 540 may be referred to as a "horizontal" waveguides.

In more detail, each first optical waveguide 540 may comprise a core 542 surrounded by cladding. It will be appreciated by those skilled in the art that the core 542 should have a refractive index higher than the cladding in order to contain light inside the waveguide 540. The material of the respective layer of optically transparent material 520, 522, 524 may act as part of the cladding. Thus, the material of the waveguide core 542 may be different from the material of the layer of optically transparent material 520, 522, 524. For example, where the optically transparent material is silica, the waveguide core 542 may be made from plastic or silicon nitride surrounded on top by another material with a refractive index lower than plastic such as silica. Alternatively, the same material may be used for the core 542 and the cladding provided the correct refractive index relation is achieved by doping. Thus, as in this example, silica material may be used for the waveguide core 542, as well as the cladding.

Each optical path 530, 532 further comprises a first non-guided optical path 550 extending from the first optical waveguide 540 through at least two of the layers of optically transparent material 520, 522, 524.

Light propagates along this non-guided optical in free space, FSO. Each first non-guided optical path 530, 532 thus comprise a portion of the optically transparent material 520, 522, 524. These non-guided optical paths 530, 535 may be referred to as "vertical" paths.

In this example, the first non-guided optical path 550 of the first optical path 530 extends through each of the three layers of optically transparent material 520, 522, 524. On the other hand, the first non-guided optical path 550 of the second optical path 532 extends through only two of the layers of optically transparent material 520, 522.

In this example, each optical path 530, 532 comprises two non-guided optical paths 550, 552, which may be referred to as "first" and "second" non-guided optical paths 550, 552. In this example, these non-guided optical paths 550, 552 extend from respective ends of the first optical waveguide 540. The second non-guided optical path 552 for the first optical path 530 extends through three layers of optically transparent material 520, 522, 524. The second non-guided optical path 552 for the second optical path 532 extends through only two of the layers of optically transparent material 520, 522.

In this example, these non-guided optical paths 550, 552 have an input/output 560 at their opposite end from the first optical waveguide 540. These input/outputs 560 are for coupling to respective ones of the optical integrated circuits 310, 320, in this example via a grating coupler 510. It should be noted that, in this example, the dimensions of the first optical waveguides 540 should be chosen to match the mode of the grating couplers 510, in order to facilitate optical coupling between the grating couplers 510 and the optical paths 530, 532.

In respect of each optical path 530, 532, a first reflective element 570 is arranged to receive light from at least one of the first non-guided optical path 550 and the first optical waveguide 540 and direct the light to the other of the first non-guided optical path 550 and the first optical waveguide 540. In this example, the first reflective element 570 both receives light from the first non-guided optical path 550 and directs said light to the first optical waveguide 540 and receives light from the first optical waveguide 540 and directs said light to the first non-guided optical path 550. In this example a second reflective element 570 is further arranged to receive light from the second non-guided optical path 552 and direct said light to the first optical waveguide 540. The second reflective element 570 is further arranged to receive light from the first optical waveguide 540 and direct said light to the second non-guided optical path 552. In this way, light may travel from the input/output 560 of the first non-guided optical path 550, along the first non-guided optical path 550, along the first optical waveguide 540 and along the second non-guided optical path 552 to the input/output 560 of the second non-guided optical path 552 and vice versa.

Where the non-guided optical paths 550, 552 are "vertical", and thereby perpendicular to the "horizontal" first optical waveguides 540, the reflective elements 570 may be arranged to reflect light at 90 degrees. This arrangement may be optimal for minimising losses. However, it should be appreciated that the propagation axes of the non-guided optical paths 550, 552 and the optical waveguides 540 may not extend at precisely 90 degrees from each other. In this case, the reflective elements 570 may be arranged to reflect light at a different angle as required.

Figure 6:
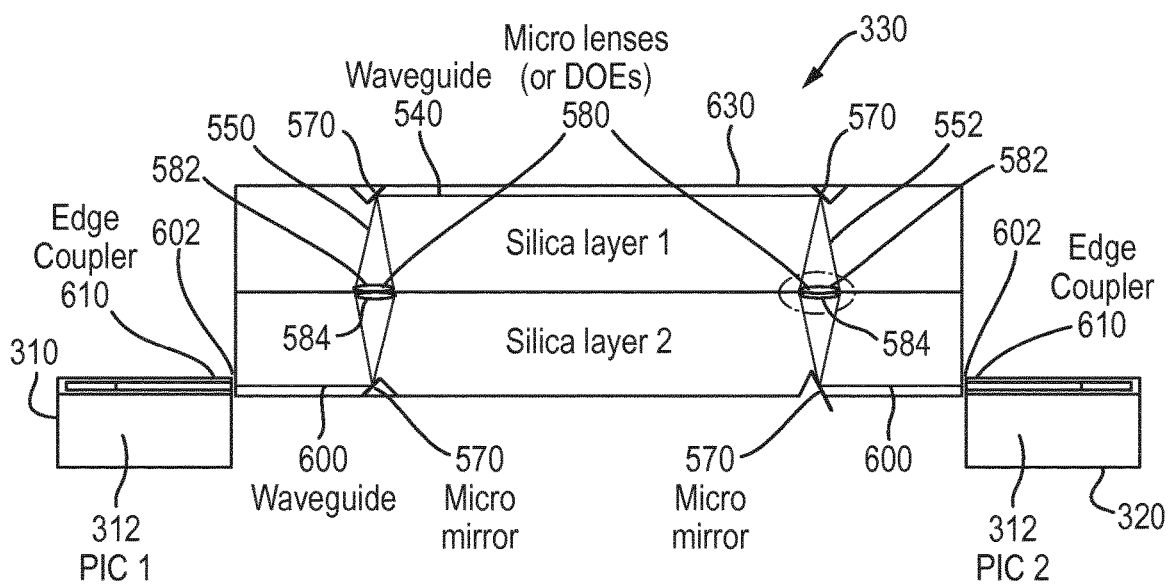
FIG. 6 illustrates an optical interconnect according to an embodiment of the invention.
Figure 7:
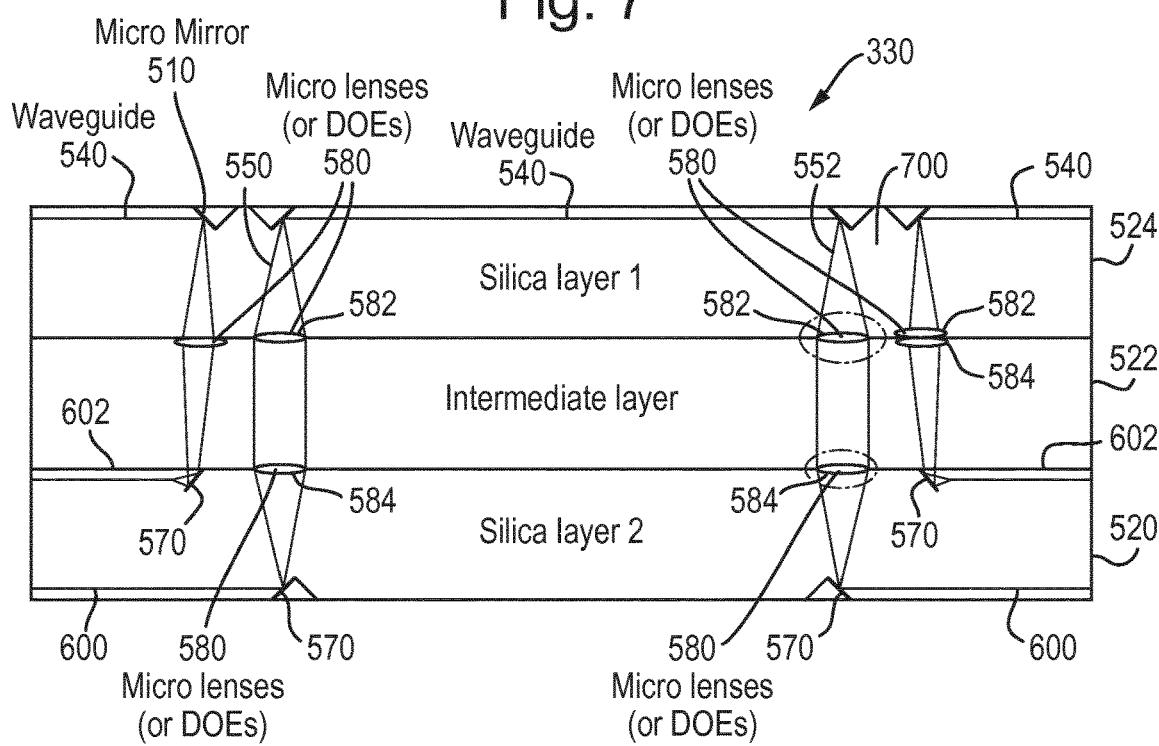
FIG. 7 illustrates an optical interconnect according to an embodiment of the invention.

The reflective elements 570 may be referred to as mirrors, for example micro mirrors. In this example, the reflective elements 570 are embedded in the respective layer of optically transparent material 520, 522, 524. However, alternatively, these reflective elements 570 may be formed for example by an edge of the respective layer of optically transparent material 520, 522, 524, as shown in FIGS. 6 and 7. In this latter case, the reflective elements 570 may be realised by angle polishing of layer edges or corners.

In addition, at least one lens 580 is arranged at an intermediate position in each of the non-guided optical paths 550, 552. The at least one lens 580 is arranged at a boundary between two of the layers of optically transparent material 520, 522, 524 through which the respective non-guided optical path extends such that the at least one lens 580 is arranged to receive and focus light travelling along the respective non-guided optical path 550, 552.

In more detail, in this example, the at least one lens 580 in the first non-guided optical path 550 (and the second non-guided optical path 552) of the first optical path 530 is arranged at the boundary between the third and second layer of the optically transparent material 522, 524. In contrast, the at least one lens 580 in the first non-guided optical path 550 (and the second non-guided optical path 552) of the second optical path 532 is arranged at the boundary between the first layer and second layer of the optically transparent material 520, 522.

In this example, the at least one lens 580 comprises two lenses: a first lens 582 and a second lens 584. This may facilitate implementation of the at least one lens 580. However, it may be possible to use a single lens, in particular where the non-guided optical path 550, 552 extends through only two layers of optically transparent material, 520, 522, 524.

In this example, the first lens 582 is arranged to receive light travelling along the respective non-guided optical path 550, 552 and output a parallel light beam. It can be seen in FIG. 5 that as light travels along each non-guided optical path 550, 552, the light diverges until it reaches the first lens 582. Although not shown in FIG. 5, since the first lens 582 and the second lens 584 are adjacent in this example, the first lens 582 produces a "parallel" light beam. This means the light beam propagates substantially parallel to the longitudinal axis of the non-guided optical path 550, 552. The second lens 584 is arranged to receive and focus this parallel light beam. In this example, the light beam is focused onto the reflective element 580 or the input/output 560 of the non-guided optical path 550, 552. It should be appreciated that, in this example, light may travel in either direction along the non-guided optical path 550, 552 and thus the "first" lens 582 may act as the "second" lens 584 and vice versa, depending on the direction of travel of light along the non-guided optical path 550, 552.

Thus, advantageously, according to embodiments of the invention "vertical" paths may extend through multiple layers of the optically transparent material without increasing optical losses. This enables the optical interconnect to have an increased interconnection density, interconnecting many pairs of integrated optical circuits without waveguide crossings and whilst limiting optical losses: A plurality of waveguides for respective interconnections may be provided on each of several layers of the optically transparent material.

As mentioned above, in this example, the first and second non-guided optical paths 550, 552 of the first optical path 530 extend through three layers of optically transparent material 520, 522, 524, whereas the first and second non-guided optical paths 550, 552 of the second optical path 532 extend through only two layers of optically transparent material 520, 522, 524. However, it should be appreciated that the optical interconnect 300 may comprise more layers of optically transparent material 520, 522, 524, and a non-guided optical path 550, 552 according to embodiments of the present invention may extend through for example four or more layers of optically transparent material.

Furthermore, whilst only two optical paths 530, 532 are shown in the optical interconnect 330 of FIG. 5, it should be appreciated that the optical interconnect 330 may comprise many more optical paths 530, 532. In particular, several first optical waveguides 540 for respective optical paths 530, 532 may be arranged on each of the layers of optically transparent material 520, 522, 524.

FIG. 7 shows an optical interconnect 330 according to a further embodiment of the invention. In this example, an optical path 700 similar to the first optical path 532 described above with reference to FIG. 5 is arranged in the optical interconnect 330. The non-guided optical paths 550, 552 of this optical path 700 extend through three layers of the optically transparent material 520, 522, 524. However, in this embodiment, the second lens 584 is arranged separate from the first lens 582. In particular the second lens 584 is arranged at a boundary between a different two of the at least three layers of optically transparent material than the first lens 582. Thus, there is an intermediate layer 522 of optically transparent material between the first lens 582 and the second lens 584. In this example, the first lens 582 is arranged between the first layer 520 and the second or intermediate layer 522 of the optically transparent material, and the second lens 584 is arranged between the second or intermediate layer 522 and the third layer 524 of the optically transparent material. In FIG. 7 it can be seen that light propagates as a "parallel" beam between the first and second lenses 582, 584. This, advantageously, enables the light to propagate through one or more intermediate layers 522 with limited optical losses. This, in turn, enables the interconnection density of the optical interconnect to be further increased as discussed above with limited optical losses.

Further, in the above examples, each optical path 530, 532, 700 has an input 560 for coupling to a first integrated optical circuit 310 and an output 560 for coupling to a second integrated optical circuit 320. These optical paths 530, 532, 700 comprise first and second non-guided optical paths 550, 552 and a first optical waveguide 540. However, it should be appreciated that various arrangements are possible, and each optical path 530, 532, 700 may comprise one or more non-guided optical paths 550, 552 i.e. "vertical" paths and one or more first optical waveguides 540 i.e. "horizontal" paths.

FIG. 6 shows an optical interconnect 330 according to another embodiment of the invention. In this example, an optical path 630 similar to the second optical path 532 described above with reference to FIG. 5 is arranged in the optical interconnect 330. However, instead of an input/output 560 for coupling to a respective optical integrated circuit 310, 312, a further reflective element 570 is provided at the opposite end of the non-guided optical paths 550, 552 from the first optical waveguide 540. In this example, an input/output 602 for coupling to a respective optical integrated circuit 310, 312, is provided at a side of the optical interconnect 330. In this example, the coupling is via an edge coupler 610. This input/output 602 is at the end of a further "horizontal" optical waveguide 600 arranged along the bottom surface of the optical interconnect 330, between the further reflective element 570 and the input/output 602. Again this further optical waveguide 600 may be arranged on the surface of the bottom layer of optically transparent material 520, or buried for example a few microns beneath the surface. The further reflective element 570 is arranged to receive light from the respective first non-guided optical path 550 and direct the light to the further optical waveguide 600 and vice versa.

Figure 8:
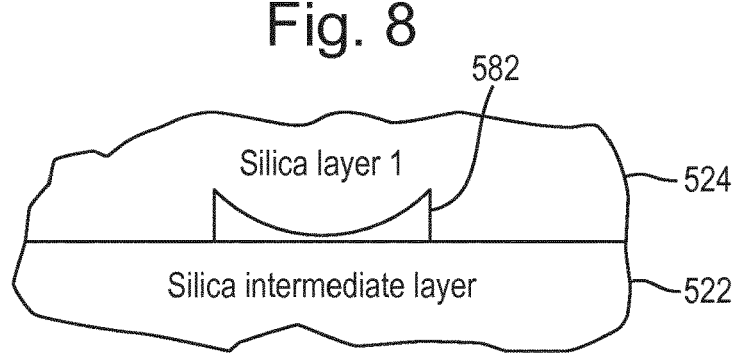
FIG. 8 illustrates an example of the at least one lens according to some embodiments of the invention.
Figure 9:
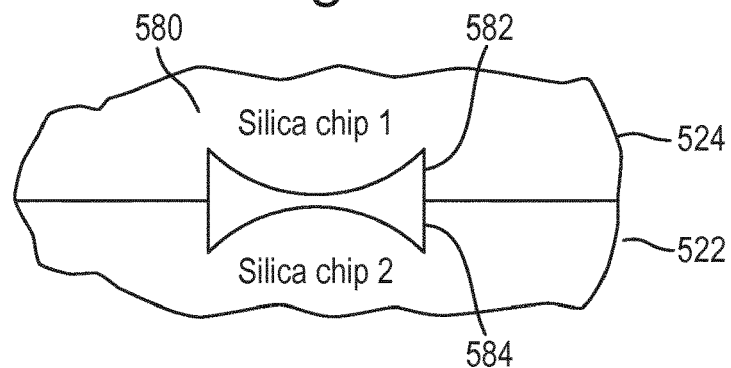
FIG. 9 illustrates an example of the at least one lens according to some embodiments of the invention.

An example of a first/second lens 582 584 is shown in FIG. 8. In this example, each lens 582, 584 which may be referred to as a micro lens, is a refractive lens. Each lens 582 584 may be etched directly onto the surface of an appropriate one of the layers of optically transparent material. In FIG. 8 one lens 582, 584 is arranged in one of the layers at whose boundary the lens 582, 584 is located, in this example in silica layer 1. In FIG. 9, a first lens 582, and a second lens 584 are arranged in respective ones of the layers at whose boundary the first and second lens 582 are located. As will be understood by those skilled in the art, the at least one lens 582, 584 can be realised in a number of ways. For example, a resist cylinder may be put on the surface and heated in order to shape it with a spherical surface. The resultant shape may then be transferred to the layer of optically transparent material by a dry etching process.

Figure 10:
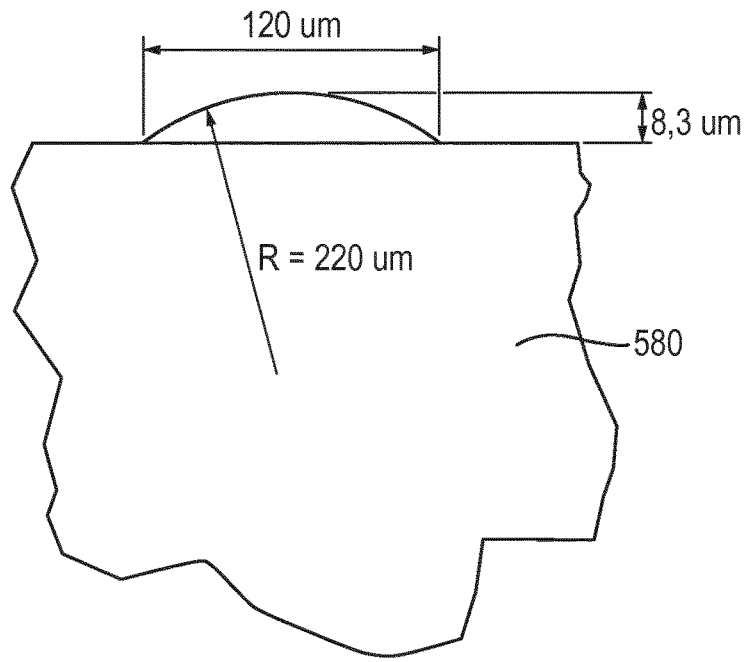
FIG. 10 shows an example of a refractive lens design.

FIG. 10 shows example dimensions of a lens 582, 584. In this example, the diameter of the lens 582, 584 is more than one hundred microns and the shape of the lens 582, 584 is substantially spherical. However, in some embodiments, the shape of the lens 582, 584 may be aspherical.

In the examples of FIGS. 8 and 9 each lens 582, 584 is formed in the surface of the respective layer of optically transparent material. More particularly, in these examples, each lens 582, 584 is etched inside the surface of the respective layer such that the centre of the lens is beneath the surface level of the layer. This advantageously avoids contact and damage of the lens 582, 584. It should be appreciated that, in this arrangement, the volume between the lens 582, 584 and the surface of the abutting layer of optically transparent material should be free of glue or the refraction index of the glue should be lower than the refraction index of the lens. Where glue is present, the refraction index of the glue should be taken into account in the lens design.

Figure 11:
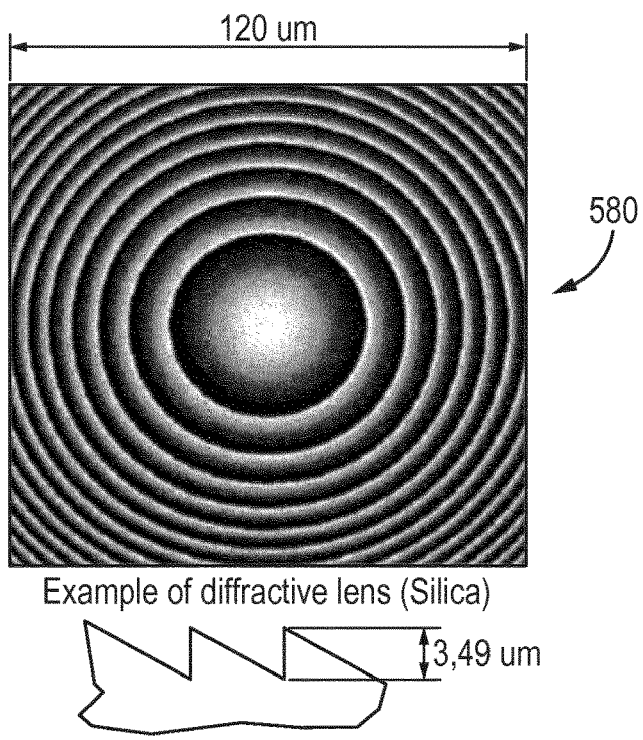
FIG. 11 shows an example of a diffractive lens design.

Alternatively, the at least one lens 582, 584 may comprise a diffractive lens. Such a diffractive lens may be referred to as diffractive optical element, DOE. An example of DOE is shown in FIG. 11. This type of lens utilises the diffraction of light. The lens may be realised by lithography. Using a DOE may have the advantage of offering a very low level of geometric aberration also with systems which are strongly non-axial. This can be useful to reduce insertion losses when a high aperture is necessary. In addition, the lens can be designed to generate a spot with a particular shape. For example, the design of the DOE may adapt the spot shape to the spot of a grating coupler, increasing coupling efficiency. On the other hand, a refractive lens may offer lower insertion loss in some instances by avoiding losses related to diffraction efficiency.

Figure 12:
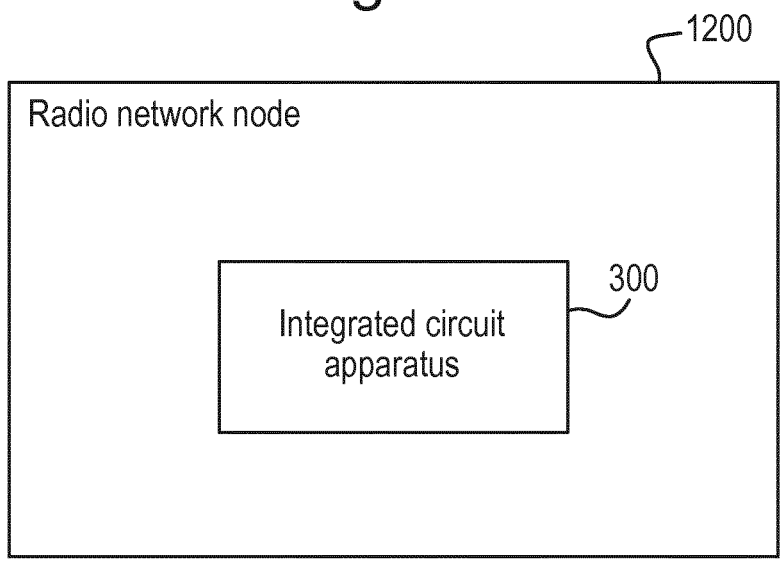
FIG. 12 shows a radio network node according to an embodiment of the invention.

FIG. 12 shows a radio network node 120 comprising an integrated circuit apparatus 300 according to an embodiment of the invention. The integrated circuit apparatus 300 (not shown in detail in FIG. 12) comprises as described above a first integrated optical circuit 310, a second integrated optical circuit 320 and an optical interconnect 500, which is arranged to optically couple the first integrated optical circuit 300 and the second integrated optical circuit 310. The optical interconnect 500 may be configured as described in any of the embodiments above. The first and second integrated optical circuits 300, 320 may be part of respective OMCMs. Each OMCM may comprise a baseband processing ASIC.

Figure 13:
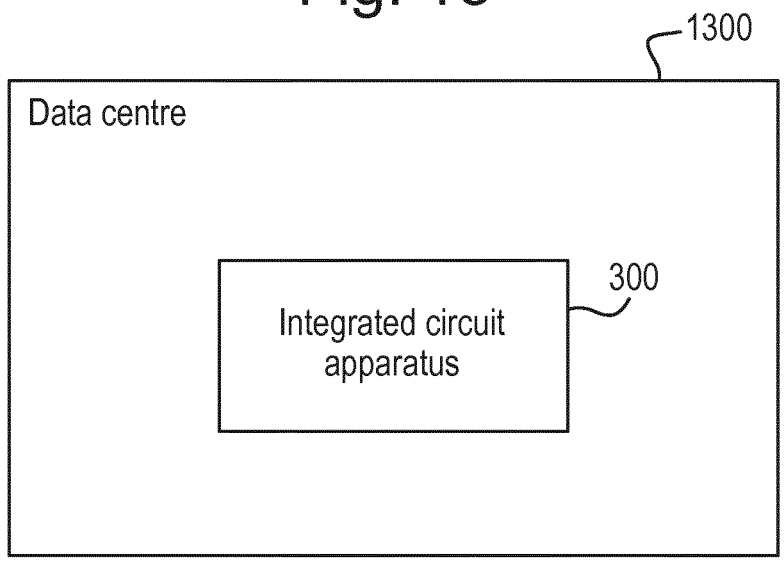
FIG. 13 shows a data centre according to an embodiment of the invention.

FIG. 13 shows a datacentre comprising the integrated circuit apparatus 300 according to an embodiment of the invention. Similarly, the integrated circuit apparatus 300 (not shown in detail in FIG. 13) comprises as described above a first integrated optical circuit 310, a second integrated optical circuit 320 and an optical interconnect 500, which is arranged to optically couple the first integrated optical circuit 300 and the second integrated optical circuit 310. The optical interconnect 500 may be configured as described in any of the embodiments described above. The first and second integrated optical circuits 300, 320 may be part of respective OMCMs. Each OMCM may comprise processing units in the form of ASICs.

Figure 14:
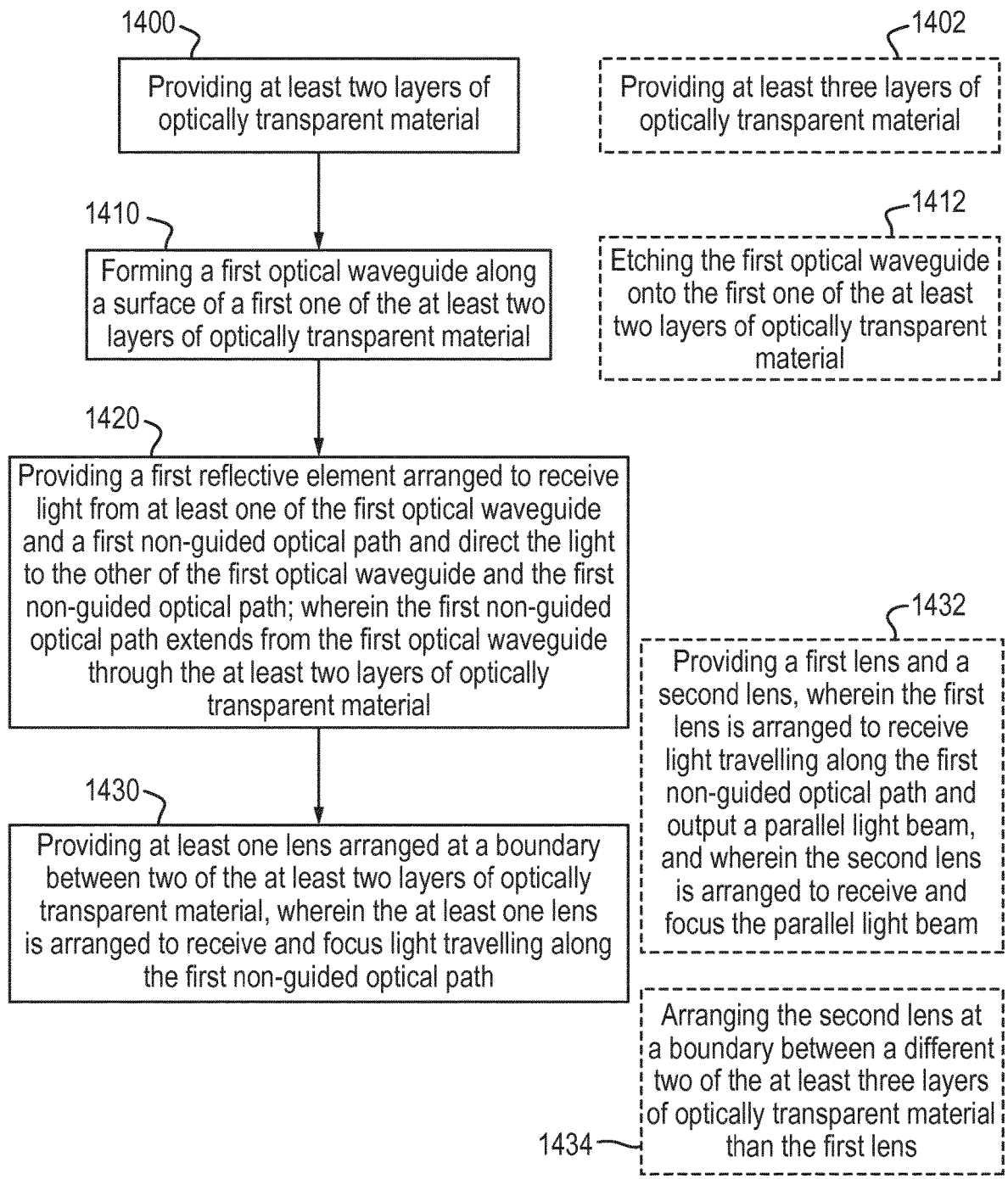
FIG. 14 is a flow chart showing a method of manufacturing according to an embodiment of the invention.

FIG. 14 is a flow chart showing a method of manufacturing an optical interconnect for optically coupling at least a first optical integrated circuit and a second optical integrated circuit according to an embodiment of the invention. These steps may be performed in a different order from that shown or simultaneously.

The method comprises at 1400 providing at least two layers of optically transparent material. The optically transparent material may for example be silica. The method further comprises at 1410 forming a first optical waveguide along a surface of a first one of the at least two layers of optically transparent material. As indicated at 1412 the first optical waveguide may be formed by etching the first optical waveguide onto the first one of the at least two layers of optically transparent material. The first optical waveguide may be made from silica. The method further comprises at 1420 providing a first reflective element arranged to receive light from at least one of the first optical waveguide and a first non-guided optical path and direct the light to the other of the first optical waveguide and the first non-guided optical path. The first non-guided optical path extends from the first optical waveguide through the at least two layers of optically transparent material. The first reflective element may be embedded in or formed by an edge of the first one of the at least two layers of optically transparent material. The method further comprises at 1430 providing at least one lens arranged at a boundary between two of the at least two layers of optically transparent material. The at least one lens is arranged to receive and focus light travelling along the first non-guided optical path. The at least one lens may be a refractive lens or a diffractive lens. The at least one lens may be formed in a surface of at least one of the at least two layers of optically transparent material.

In a preferred embodiment, step 1432 may comprise providing a first lens and a second lens. The first lens may be arranged to receive light travelling along the first non-guided optical path and output a parallel light beam. The second lens may be arranged to receive and focus the parallel light beam.

In this preferred embodiment, step 1432 may advantageously further comprise at 1434 providing at least three layers of optically transparent material. Further, step 1434 may comprise arranging the second lens at a boundary between a different two of the at least three layers of optically transparent material than the first lens.

In some embodiments, the method may further comprise providing an input for coupling a first optical integrated circuit and an output for coupling to a second optical integrated circuit. The method may further comprise providing an optical path for coupling the input to the output, which comprises the first optical waveguide and the first non-guided optical path. It will be appreciated that various arrangements are possible.

It should be appreciated that the above method of manufacture may advantageously be used to form multiple optical paths in the optical interconnect for coupling multiple pairs of optical integrated circuits. Advantageously, several first optical waveguides may be provided on each of the plurality of layers of optically transparent material, in a single process. A femtosecond laser technique is not required. Furthermore, it is not necessary to drill holes in the structure.

Thus, embodiments of the present invention provide an improved optical interconnect, which may have an increased interconnection density, whilst offering lower loss and being easier and cheaper to manufacture and thus to mass produce than prior art optical interconnects.

The invention claimed is:

1. An optical interconnect for optically coupling at least a first optical integrated circuit and a second optical integrated circuit, the optical interconnect comprising:
   at least two layers of optically transparent material;
   a first optical waveguide arranged along a surface of a first one of the at least two layers of optically transparent material;
   a first non-guided optical path extending from the first optical waveguide through the at least two layers of optically transparent material;
   a first reflective element arranged to receive light from at least one of the first non-guided optical path and the first optical waveguide and direct the light to the other of the first non-guided optical path and the first optical waveguide; and
   at least one lens arranged at a boundary between two of the at least two layers of optically transparent material, wherein the at least one lens is arranged to focus light that is received by the at least one lens from a first portion of the first non-guided optical path and emitted from the at least one lens into a second portion of the first non-guided optical path.

2. An optical interconnect according to claim 1, wherein the at least one lens comprises a first lens and a second lens, wherein the first lens is arranged to receive light travelling along the first non-guided optical path and output a parallel light beam, and wherein the second lens is arranged to receive and focus the parallel light beam.

3. An optical interconnect according to claim 2, wherein the at least two layers of optically transparent material comprise at least three layers of optically transparent material, and wherein the second lens is arranged at a boundary between a different two of the at least three layers of optically transparent material than the first lens.

4. An optical interconnect according to claim 1, wherein the at least one lens comprises a refractive lens or a diffractive lens.

5. An optical interconnect according to claim 1, wherein the at least one lens is formed in a surface of at least one of the at least two layers of optically transparent material.

6. An optical interconnect according to claim 1, wherein the optically transparent material is silica.

7. An optical interconnect according to claim 1, further comprising:
   an input for coupling to a first optical integrated circuit; and
   an output for coupling to a second optical integrated circuit; and an optical path arranged to optically couple to the input to the output,
   wherein the optical path comprises the first optical waveguide and the first non-guided optical path.

8. An optical interconnect according to claim 1, wherein the reflective element is embedded in or formed by an edge of the first one of the at least two layers of optically transparent material.

9. An integrated circuit apparatus comprising:
   a first integrated optical circuit;
   a second integrated optical circuit; and an optical interconnect according to claim 1, wherein the optical interconnect is arranged to optically couple the first integrated optical circuit and the second integrated optical circuit.

10. A radio network node comprising an integrated circuit apparatus according to claim 9.

11. A datacentre comprising an integrated circuit apparatus according to claim 9.

12. A method of manufacturing an optical interconnect for optically coupling a first optical integrated circuit and a second optical integrated circuit, the method comprising:

providing at least two layers of optically transparent material;

forming a first optical waveguide along a surface of a first one of the at least two layers of optically transparent material;

providing a first reflective element arranged to receive light from at least one of the first optical waveguide and a first non-guided optical path and direct the light to the other of the first optical waveguide and the first non-guided optical path, wherein the first non-guided optical path extends from the first optical waveguide through the at least two layers of optically transparent material; and providing at least one lens arranged at a boundary between two of the at least two layers of optically transparent material, wherein the at least one lens is arranged to focus light that is received by the at least one lens from a first portion of the first non-guided optical path and emitted from the at least one lens into a second portion of the first non-guided optical path.

13. A method according to claim 12, wherein providing the at least one lens comprises providing a first lens and a second lens, wherein the first lens is arranged to receive light travelling along the first non-guided optical path and output a parallel light beam, and wherein the second lens is arranged to receive and focus the parallel light beam.

14. A method according to claim 13, wherein providing the at least two layers of optically transparent material comprises providing at least three layers of optically transparent material, and wherein providing the first lens and the second lens comprises arranging the second lens at a boundary between a different two of the at least three layers of optically transparent material than the first lens.

15. A method according to claim 12, wherein forming the first optical waveguide comprises etching the first optical waveguide onto the first one of the at least two layers of optically transparent material.

* * * * *